Feb. 27, 1962  C. S. BROWN  3,022,666
FLOAT GUIDE FOR A SEWER REGULATOR
Filed Aug. 3, 1960  2 Sheets-Sheet 1

INVENTOR.
Chalmers S. Brown
BY
ATTORNEY

Feb. 27, 1962 C. S. BROWN 3,022,666
FLOAT GUIDE FOR A SEWER REGULATOR
Filed Aug. 3, 1960 2 Sheets-Sheet 2

INVENTOR.
Chalmers S. Brown
BY
ATTORNEY

United States Patent Office 3,022,666
Patented Feb. 27, 1962

3,022,666
FLOAT GUIDE FOR A SEWER REGULATOR
Chalmers S. Brown, Lima, Ohio, assignor to Brown & Brown, Incorporated, Lima, Ohio, a corporation of Ohio
Filed Aug. 3, 1960, Ser. No. 47,184
4 Claims. (Cl. 73—322.5)

My invention broadly concerns sewerage and the regulation of sewage flow through a sewer system. More particularly, the invention concerns an improvement in the apparatus shown in my previous United States Letters Patent Nos. 2,150,359 and 2,882,919 issued March 14, 1939, and April 21, 1959, respectively. Most particularly, my invention relates to guide means for floats designed to actuate sewer regulating valves.

As was made apparent in my previously issued patents, the making of sewer regulators to depend upon the movement of floats, in response to the falling and rising of the water in the sewer produces a desirable automaticity of regulation. In order that the float may be responsive to such flow it is, therefore, necessary to support the float in a position immersed in the sewer flow or in a position so as to be immersed by the flow through the sewer, when certain critical flow levels are reached.

This is the arrangement shown in the patents structures I have mentioned. Sewer flow, as is to be expected, carries sediment and waste and this, when the flow diminishes or falls, may be deposited and left behind on various regulator parts, including those parts which support the float for its flow responsive and valve controlling movements. For example, in the apparatus of my mentioned patents, the floats are shown mounted so as to slide upon and between two vertically and parallel extending guide rods upstanding from the float or regulator chamber floor. When the sewer flow passes over and around the floats and guide rods, refuse and sediment will be filtered out and will collect on the surfaces between the float and the guide rods. This fouls the bearings between the rods and float and may prevent the float from later responding freely to the flow and to the rise and fall thereof in the chamber. Failure to be responsive may render the regulator totally inoperative or to lag and delay so that the efficiency of the regulator is materially reduced.

Hence, it is one of the primary objects of my invention to provide an improved float mounting means and particularly one which may not be fouled as easily as that which is now commonly used in the art.

Another object of my invention is to provide a float mounting means which permits the float to freely rise and fall in response to the fall and rise of sewer flow in the float or regulator chamber but which, not withstanding such freedom, will resist any tendency the float may have to move laterally in response to sewer flow.

A still further object of my invention is to provide a float guide for sewer regulators of a simple and economic structure, easy to install and adjust, inexpensive to maintain and repair and yet having all of the advantages of the prior art structures including that shown in my prior patents, without the disadvantage of likely fouling and the resultant failure of the sewer control system by reason thereof.

A still further and more particular object of the invention is to provide a non-fouling float guide means for a sewer regulator which includes a float or regulator chamber supported bracket to which a link is pivotally connected to provide a means for connecting the float to the float or regulator chamber wall and a means whereby the float may rise and fall with the sewer flow in the float chamber and be held against lateral movement within the float or regulator chamber. More particularly, it is another object of my invention to provide means whereby the link mentioned is connected to the chamber wall at a point that is on a line extending horizontally to intersect the path of movement of the float to operate the regulator valve substantially midway the upper and lower ends of such path of movement. By such provision, the float movement is assuredly free on either side of such mid-point and may be relied upon therefore to actuate the sewer regulator valve connected thereto. A still further and particular object of my invention is to provide means by which a mounting of the float may be adjusted horizontally relative to the float or regulator chamber and so as to be thus positioned for a most responsive action therein relative to the telltale or flume supplying or carrying away the sewer flow. A still further and even more particular object of my invention is to provide a means for supporting the float in spaced relation to the floor of the float or regulator chamber and to provide thereby a limiting stop the the lower or falling movement of the float in response to the fall of sewer flow in the chamber.

My invention has for further objects those of providing other advantageous structures and arrangements which will appear from the following description and from an examination of the accompanying drawings. Float guides for sewer regulators containing my invention may take various forms, one of which appears to me, at this time, to be the best mode of carrying out my invention. I shall describe such form and in doing so shall make reference to the accompanying drawings. However, I do not imply by such description or reference to such drawings that variation from such described or illustrated form is beyond the contemplation of any invention I may make manifest herein.

FIG. 1 of the accompanying drawings, illustrates, in elevation, a sectional view of housing for a sewer regulator and showing a float guide for a sewer regulator contained therein embodying the features of my invention.

Figure 1:
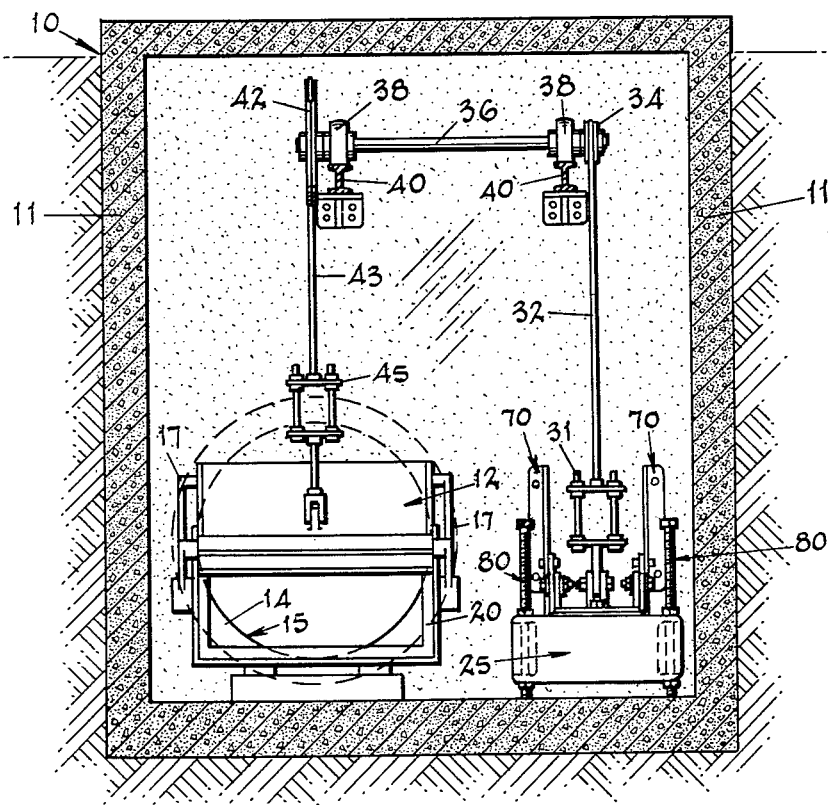
Figure 2:
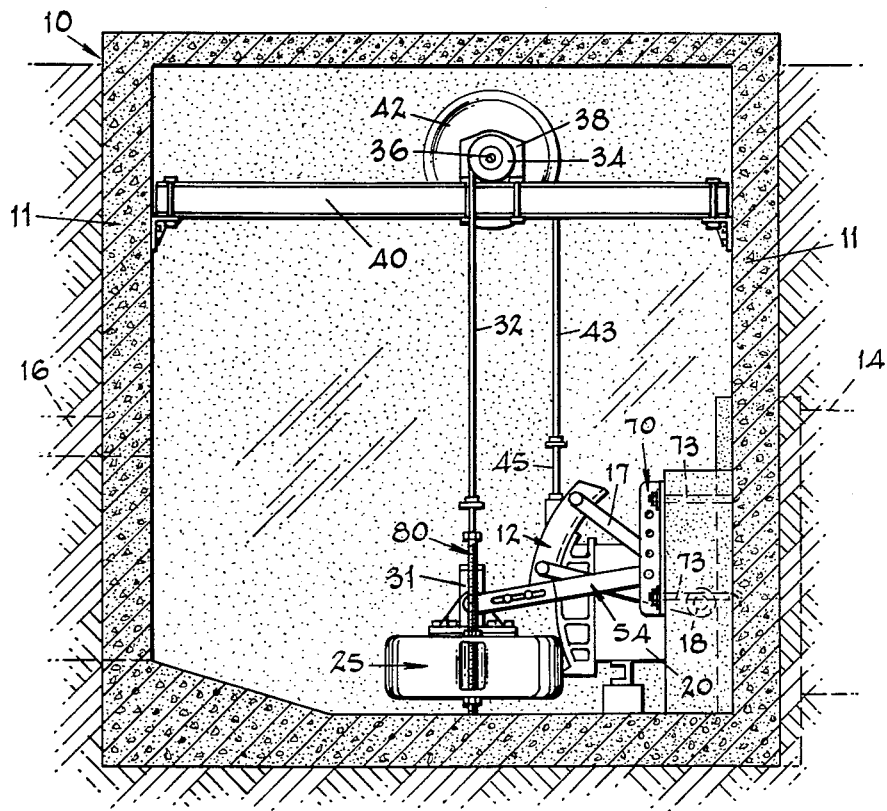
FIG. 2 illustrates, in elevation, a sectional view of a sewer regulator chamber taken along a plane at ninety degrees from which the view shown in FIG. 1 is taken.
Figure 4:
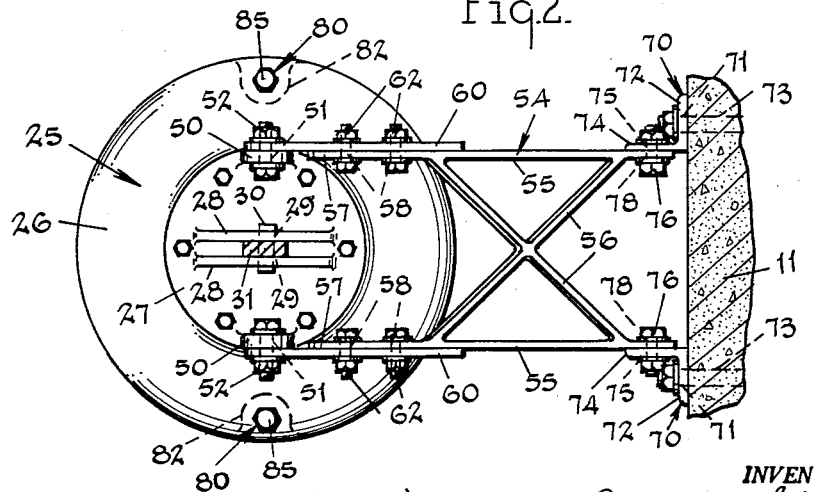
FIG. 4 illustrates an enlarged plan view of the float guide showni n FIG. 3.

Referring now to FIGS. 1 and 2 of the accompanying drawings, it will be seen that there a housing 10, such as that formed by concrete slab walls 11, is shown for enclosing and providing a chamber for a sewer regulator, such as a valve 12. The housing 10 is in a sewer system between the upstream and downstream ends thereof. As shown, a conduit 16 connecting the upstream end of sewer system connects and communicates with the chamber of the regulator housing 10 through an opening 15. The downstream end of the sewer system connects and communicates with the regulator chamber through a conduit 14, as may be dictated by the open or closed condition of the valve 12 regulating that flow.

Preferably, the valve 12 is mounted by side arms 17 pivotally engaging horizontally extending pins 18 protruding from the side of a suitable flume 20 extending into the housing 10. The outer end of the flume 20 extends through the wall 11 of the housing 10 and communicates with the downstream conduit 14 of the sewer system. The valve 12 is thus supported for up and down movement to open and close the flume 20 and control the flow from upstream conduit 16 to the downstream conduit 14.

By this arrangement, it will be seen that the weight of the valve 12, as supplemented, if needed, by suitable shutterweights or counterweights, operates to close the valve 12. In order to open the valve, it must be raised and to accomplish this a counter-balancing float 25 is provided.

The float 25 is essentially conventional in structure having a hollow metal drum-like body 26. The body 26 is closed by a centrally disposed cover or closure plate 27. The plate 27 has a pair of upstanding spaced and parallel extending ears 28 in which openings 29 are formed to provide a clevis and receive a pin 30 of a suitable turn buckle hitch 31. The hitch 31 is connected to one end of a chain or cable 32. The other end of the cable 32 is connected to and may be looped around a pulley windlass 34 mounted on and keyed to a shaft 36. The shaft 36 is mounted high in the regulator chamber for rotation on spaced journals 38 supported on trusses 40 within the housing 10.

The shaft 36 also mounts a second pulley windlass 42 that, like windlass 34, is keyed to the shaft 36. A chain or cable 43, whose one end is connected to and may be looped around the windlass 42 extends downwardly in the regulator chamber and by a suitable turnbuckle hitch 45 has its other end suitably connected to the valve 12.

By adjustment of the cables 32 and 43, particularly by adjusting their effective lengths, as by looping them more or less over their respective windlasses 34 and 42, the valve 12 and float 25 may be set in a relation of slight off-balance, in which the weight of the valve 12 exerted through cable 43 on the windlass 42 and thus through shaft 36 to the windlass 34 and cable 32 to the float 25, is not quite enough to overcome the weight of the float 25 likewise exerted. Hence, the float 25, when in its lowermost position, holds the valve 12 fully open. When, however, the float 25 is caused to rise, as by a rising sewer flow from conduit 16 into the regulator chamber it will be caused to do, the valve 12, no longer restrained by the weight exerted by the float 25, falls and closes. When the float 25 falls, as it will when the sewer flow diminishes and no longer serves to buoy the float 25 up, the valve 12, no longer free to respond to its own weight and remain closed, will be lifted to an open position.

Thus, it becomes apparent that unless the float 25 is free to and does freely respond, by promptly rising and falling, to the sewer flow rising and falling, the automaticity with which the valve 12 opens and closes will be materially affected. Mounting the float 25 so as to be readily responsive at all times to the rise and fall of sewer flow and with a minimum of likely fouling is the primary objective of my invention. An embodiment to accomplish that end in accordance with the teachings of my invention will now be described.

In addition to the ears 28, the float closure plate 27 has a second pair of upstanding parallel extending ears 50. Whereas the ears 28 are close together and near to the axis of the plate 27, the ears 50 are as widely spaced as the diameter of the plate 27 and extend upwardly from points near the peripheral edge thereof. The ears 50 each have openings 51 that provide journals by which suitable pin and nut assemblies 52 may extend therethrough and pivotally connect free ends of a float mounting link or beam 54.

The beam 54 preferably comprises a pair of side bars 55 that are joined and held in spaced parallel relation by a crossed pair of spreader rods 56. The rods 56 are welded at their intersecting points with each other and with the side bars 55 to thus form an integrated truss. Certain ends 57 of the side bars 55 at one end of the truss, thus formed, mount an adjusting arm 60. The bar ends 57 have openings 58 that support bolt and nut assemblies 62 extending therethrough and through a slot 63 in each arm 60. The bolt and nut assemblies 62 adjustably clamp the arms 60 in some desired extending position from the ends 57 of the side bars 55 and thus serve to vary the effective length of the truss. The arms 60 are in turn connected to the ears 50 on the float closure plate 27 by the heretofore described pin and nut assemblies 52.

In order to mount the other end of the truss formed by the sidebars 55, a pair of wall brackets 70 are provided. The brackets 70 are preferably formed of short lengths of angle iron and having openings 71 in one leg 72 thereof proximate each end thereof. The openings 71 permit threaded ends of suitable anchor bolts 73 embedded in a chamber wall 11 of the regulator housing 10 to extend therethrough and receive suitable lock nuts to fixedly mount the brackets 70 on the wall 11. The other leg 74 of each of the brackets 70 protrudes outwardly from the wall 11, like a vertical extending fin, and has a plurality of openings 75 spaced along the length of the bracket. The openings 75 each provide a journal at various heights from the floor of regulator housing chamber to which, by means of suitable pin and nut assemblies 76, the ends of the side bars 55 may be pivotally connected. To accommodate the pins of the assemblies 76, the side bars 55 have end openings 78. Thus, it will be seen that the truss formed by the assembled side bars 55 provides a pivotable beam or link by which the float 25 is movably connected to the wall 11 and may rise and fall within the regulator housing 10 but is firmly prevented from moving laterally therein.

In order to support the float 25, when at rest and in its non-buoyed lowermost position, a plurality of legs 80 are provided. Preferably, the legs 80 have threaded shanks 81 that extend through and are housed in recesses or bays 82 formed in the axially extending periphery or rim of the float 25 and through threaded openings 83 in ears 84 at the axially opposite ends of each bay 82. By rotating the legs 80, as by a head 85 provided thereon, the degree to which the lower ends of the legs 80 project downwardly from and operate to support the float may be adjusted. Suitable lock nuts 86 may be provided to set the legs in any desired adjusted relation.

Figure 3:
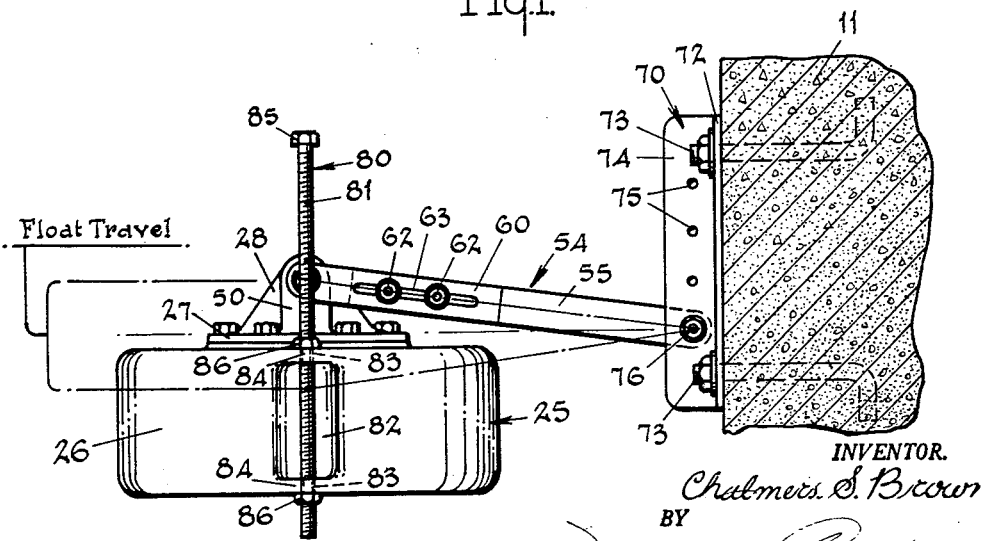
FIG. 3 illustrates an enlarged view in elevation, of the float guide shown in FIG. 1.

By supporting the float 25 in spaced relation to the floor of the regulator chamber, flow to, through, and fro mthe chamber within the housing 10 will not be impeded by the float, as it might be, were the float to rest on the chamber floor. Also, by providing the legs 80 to support the float 25 in its lowermost position, the selection of the particular journal openings 75 in the brackets 70 to which the truss end openings 78 are to be connected may be made in a manner to secure the most efficient float action. Specifically, as shown in FIG. 3 of the accompanying drawings, the legs 80 are adjusted to support the float 25, when at rest, so that horizontal line drawn from each of the axis of the journal openings 75 in brackets 70 to which the truss is pivotally connected intersect the path of movement or float travel, indicated in FIG. 3, at a point half way between its ends. This assures that the float movement is limited to a desirable substantially straight line movement, despite the pivotal connection thereof with the wall 11.

When field conditions require that higher journal openings 75 on the brackets 70 to be used to pivotally support the float mounted truss, the legs 80 are extended further than shown in FIG. 3 and so as to maintain the relation just described for the most efficient operation. Thus, the legs 80 and their disposition cooperate with the truss in its mounting on the wall 11 to provide, in the combination, means by which various exigencies met with in the practicality of installations may be conveniently and expeditiously solved.

I claim:

1. For use in a sewer system having a sewer flow control valve between the ends of the sewer system in operative connection with and operated by a movable float in a chamber in flow receiving and discharging relation to the sewer system and responsive to sewer flow therethrough by rising and falling to the rise and fall of sewer flow in and out of the chamber, a non-fouling float supporting means comprising a pair of brackets; each bracket being an angle iron and having a plurality of bearings in one leg thereof and in spaced relation along the length thereof; a plurality of anchor bolts in engagement with the other leg of each bracket and adapted for supporting the brackets in vertically extending spaced parallel relation with the first mentioned leg of each bracket extending outwardly; a pair of side bars having end journals; a pair of stretcher braces in engagement with each side bar and adapted to support the side bars in spaced parallel relation and thereby form a truss therewith; a pivot member in adjustable engagement with each bar end journal and one of the bracket bearings for supporting the truss for pivotal beam movement about one of a plurality of horizontally extending axes; a pair of slotted arms having end journals; bolt and nut assemblies extending through the slot of each arm and in engagement with free ends of each truss side bar for adjustably supporting the arms on the truss and to vary the effective length of the truss; the float having a pair of spaced upstanding ears; each ear having a bearing therein; and a pivot member in engagement with each arm end journal and a float ear bearing whereby the float and truss beam are pivotally connected together to support the float for vertical movement and against lateral movement in response to sewer flow.

2. A non-fouling float supporting means as described in claim 1 in which the float has a pair of spaced peripheral ears in spaced relation to another like pair of spaced peripheral ears; each ear having a threaded opening therein; legs extending through the openings in each pair of ears; and means threadably engaging the legs adapted to engage the ears to adjustably lock the legs in extending relation to the float to provide an under support and lower stop on the float.

3. For use in a sewer system having a sewer flow control valve between the ends of the sewer system in operative connection with and operated by a movable float in a chamber in flow receiving and discharging relation to the sewer system and responsive to sewer flow therethrough by rising and falling to the rise and fall of sewer flow in and out of the chamber, a non-fouling float supporting means comprising a bracket; means in engagement with the bracket adapted to fixedly support the bracket; a link; one end of the link pivotally connected to the float and the other end of the link pivotally connected to the bracket at a point on a horizontally extending line intersecting the vertical path of the float rise and fall responsive to the sewer flow at a point substantially midway the terminals of the path whereby the float, though free to rise and fall, is retained against lateral movement in response to sewer flow.

4. A non-fouling float support means as described in claim 3 in which the link comprises two parts, one end of one part being pivotally connected to the float and one end of the other part being pivotally connected to the bracket, the other end of the parts being in overlapping relations; bolt in engagement with the overlapping ends of each part to adjustably connect the parts together at various relations to thus enable the effective length of the link to be varied.

References Cited in the file of this patent
UNITED STATES PATENTS

| | | |
|---|---|---|
| 2,316,377 | Wilhelm | Apr. 13, 1943 |
| 2,882,729 | Weiser | Apr. 21, 1959 |
| 2,882,919 | Brown | Apr. 21, 1959 |